April 24, 1951  A. BECHLER  2,550,036
SPLIT COLLET CHUCK
Filed Nov. 21, 1947
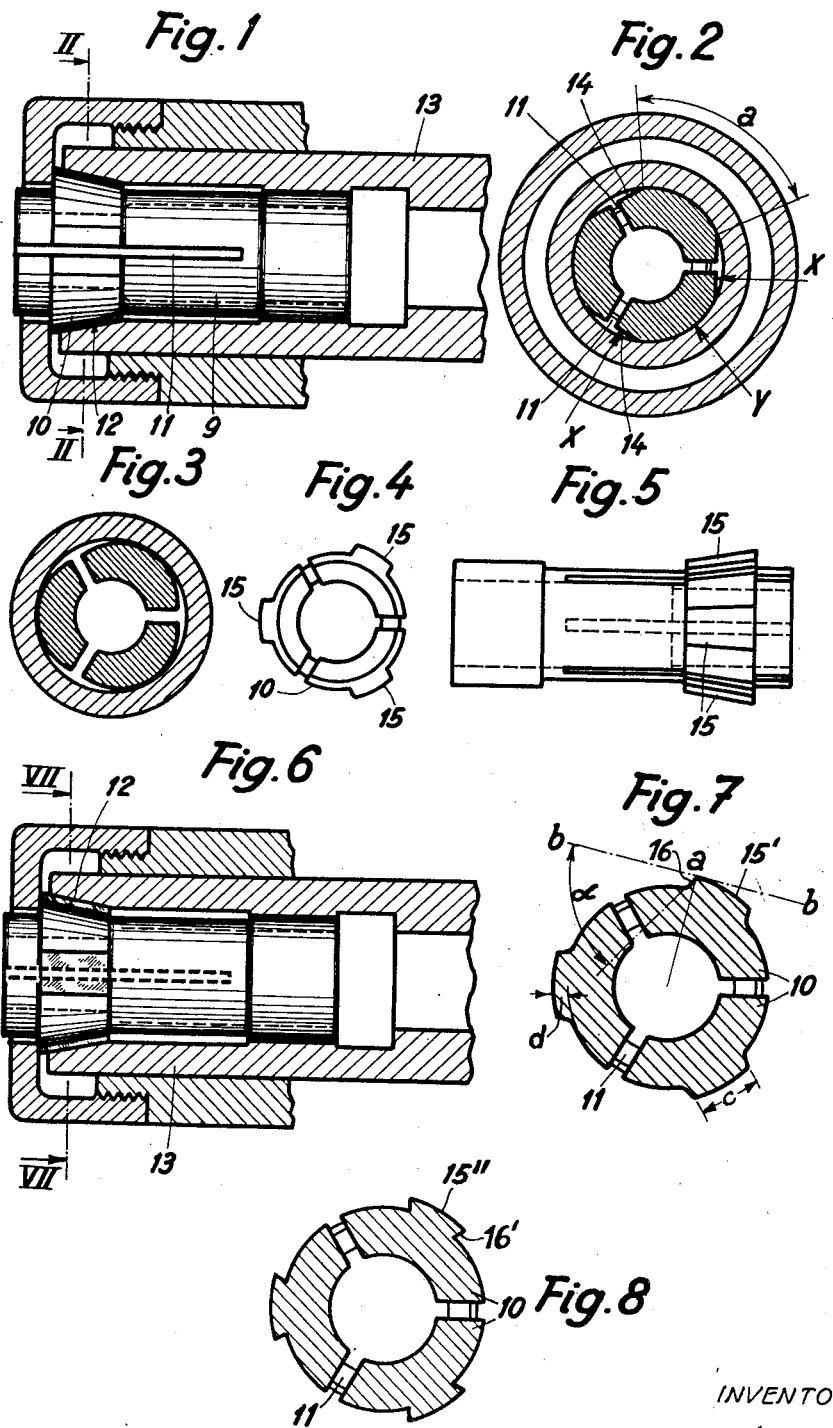
INVENTOR:
ANDRÉ BECHLER
BY K. A. Mayr.
ATTORNEY.

Patented Apr. 24, 1951

2,550,036

UNITED STATES PATENT OFFICE 2,550,036

SPLIT COLLET CHUCK

André Bechler, Moutier, Switzerland

Application November 21, 1947, Serial No. 787,363
In Switzerland December 6, 1946

7 Claims. (Cl. 279—52)

The present invention relates to an improved design of split collets of chucks, particularly for drills and lathes.

Split collet chucks are known to posses at their extremity a closing taper corresponding to a tapered opening which is generally made in the machine tool spindle to which the split collet chuck is fitted, or in a special device, which is fixed on the spindle. If in automatic turret lathes, for example, opening and closing of the chuck fixing the work to the spindle has to be done rapidly and at very frequent intervals, the tapers are subject to excessive wear. In this case the surface widens and the closing force, which should be applied to the middle portion of the chuck segment, is distributed on a surface which increases on either side of this middle with increased wear. This produces lateral components and, with the same force applied to the chuck, considerably decreases the closing effect.

The primary object of my invention is the provision of a split collet chuck whose segments have a longitudinal embossment projecting from their exterior surface and engaging the closing taper.

The outer surfaces of the embossments are preferably portions of a cone and the lateral surfaces are in substantially diametrical planes of said cone. Thus, in spite of the wear of the chuck, the contact surface of each segment will remain substantially the same and the closing force, once adjusted, will remain constant up to the time when the chuck is being discarded.

The accompanying drawing represents, apart from two conventional chuck models possessing the above mentioned disadvantages, three modifications of the split collet chuck according to the invention.

In the drawing:

Fig. 1 is an elevation, partly in section, of a chuck as generally used for machine tools;

Fig. 2 is a section on line II—II of Fig. 1;

Fig. 3 is a similar section through another conventional chuck therefor;

Fig. 4 is an end view of a chuck jaw member according to the invention, the lateral view of which is shown in Fig. 5;

Fig. 6 is a longitudinal sectional view of a chuck provided with a modified jaw member according to the invention;

Fig. 7 is a large scale sectional view taken on line VII—VII of Fig. 6 of the jaw member shown in said figure;

Fig. 8 is a transversal section of a third modification of a collet according to the invention.

With reference to Figs. 1 and 2, jaw member 9 possesses three segments 10 separated by slots 11 set at 120°. The tapered head cooperates as usual with a tapered opening 12 provided in the spindle 13 of the machine on which the chuck is fitted. By pushing member 9 towards the right by conventional means which are not shown, the jaws are closed on the workpiece.

Flat surfaces 14 have been cut at right angle to the slots 11 to assure that in spite of the wear of the jaws they can always carry out a radial movement. This arrangement is but a palliative, because wear has inevitably the effect of increasing the arc $a$. This produces radial pressure components along arrow $x$, considerably decreasing the closing effect which theoretically should act exclusively in the direction of arrow $y$.

The same disadvantages exist in the chuck according to Fig. 3 where the outer surface curvature of the segments is eccentric with respect to the opening of the chuck. The beneficial effect of this arrangement is of short duration only. Upon wear, the contact surface increases, lateral components are produced and the closing becomes unsatisfactory.

In the chuck according to the invention each segment 10 is provided in its middle portion with an embossment 15 the curvature of which is concentric with the opening of the chuck and the surface of which is on a cone corresponding to that of the opening 12 of the closing member. The flanks of the embossments are in planes converging in radial lines at the apex of the cone. It is obvious that in such a chuck the unavoidable wear will not increase laterally the contact surface between the jaw member and the closing taper and the inconveniences experienced with conventional chuck according to Figs. 1, 2 and 3 are avoided.

Embossments as designated by numeral 15 may be embodied in any kind of chuck. The width $c$ of the outside surface of the embossments engaged by the compression sleeve is substantially greater than the radial protrusion $d$ of the embossments.

The chuck represented in Figs. 6 and 7 also possesses segments or jaw portions 10 separated by slots 11 set at 120° and cooperating in the conventional manner with a tapered opening 12 provided at the extremity of a closing sleeve 13. Each segment of the chuck has an embossment 15' which effects engagement of the chuck with the sleeve. The longitudinal edges of the embossment are in contact with the closing sleeve at quite determinate points. The sides 16 of the embossments diverge with respect to the center of the chuck and enclose at any point of contact, such as $a$, for example, with the tangent $b$—$b$ of the circle of the sleeve including point $a$ an angle $a$ which is greater than the angle of friction of the materials from which the chuck and the workpiece are made. This prevents chips, detached from the bar used for producing the workpiece, from entering between one of the embossments of the chuck and the closing sleeve when the chuck is open and when the embossments bear against the wall of the tapered opening, due to the elasticity of the segments.

In the modification according to Fig. 8, the difference between the two angles has been considerably increased, the sides 16' of the embossment 15" converging toward the center of the chuck.

What I claim is:

1. A chuck for drills and lathes comprising a closing sleeve member having a conical inside surface portion; a collet axially slidable in said sleeve member and having a portion with a conical outside surface facing said inside surface portion, substantially radial slots in said collet extending in axial direction from one end thereof through its portion with the conical outside surface and forming a plurality of radially resilient jaw portions on said collet, longitudinal embossments protruding from the outside of said jaw portions between said slots, each embossment having an outside surface engaging and conforming with respective portions of said conical inside surface portion of said sleeve member and having two flanks extending substantially radially from the outside of the jaw portion and symmetrically with respect to an imaginary diametrical median plane of the respective jaw portion, the width of the outside surface of said embossments being substantially greater than the radial protrusion of said embossments.

2. A chuck for drills and lathes comprising a closing sleeve member having a conical inside surface portion; a collet axially slidable in said sleeve member and having a portion with a conical outside surface facing said inside surface portion, substantially radial slots in said collet extending in axial direction from one end thereof through its portion with the conical outside surface and forming a plurality of radially resilient jaw portions on said collet, longitudinal embossments protruding from the outside of said jaw portions between said slots, each embossment having an outside surface engaging and conforming with respective portions of said conical inside surface portion of said sleeve member and having two flanks extending from the outside of the jaw portion in planes which are substantially parallel to the longitudinal axis of the chuck, the width of the outside surface of said embossments being substantially greater than the radial protrusion of said embossments.

3. A chuck for drills and lathes comprising a closing sleeve member having a conical inside surface portion; a collet axially slidable in said sleeve member and having a portion with a conical outside surface facing said inside surface portion, substantially radial slots in said collet extending in axial direction from one end thereof through its portion with the conical outside surface and forming a plurality of radially resilient jaw portions on said collet, longitudinal embossments protruding from the outside of said jaw portions between said slots, each embossment having an outside surface engaging and conforming with respective portions of said conical inside surface portion of said sleeve member and having two flanks extending from the outside of the jaw portion in planes which converge toward the longitudinal axis of the chuck and are positioned symmetrically to an imaginary diametrical median plane of the respective jaw portion, the width of the outside surface of said embossments being substantially greater than the radial protrusion of said embossments.

4. A chuck for drills and lathes comprising a closing sleeve member having a conical inside surface portion; a collet axially slidable in said sleeve member and having a portion with a conical outside surface facing said inside surface portion, substantially radial slots in said collet extending in axial direction from one end thereof through its portion with the conical outside surface and forming a plurality of radially resilient jaw portions on said collet, longitudinal embossments protruding from the outside of said jaw portions between said slots, each embossment having an outside surface engaging and conforming with respective portions of said conical inside surface portion of said sleeve member and having two flanks extending from the outside of the jaw portion in planes which diverge with respect to the longitudinal axis of the chuck and are positioned symmetrically to an imaginary diametrical median plane of the respective jaw portion, the width of the outside surface of said embossments being substantially greater than the radial protrusion of said embossments.

5. A chuck for drills and lathes comprising a closing sleeve member having a conical inside surface portion; a collet axially slidable in said sleeve member and having a portion with a conical outside surface facing said inside surface portion, substantially radial slots in said collect extending in axial direction from one end thereof through its portion with the conical outside surface and forming a plurality of radially resilient jaw portions on said collet, longitudinal embossments protruding from the outside of said jaw portions between said slots, each embossment having an outside surface engaging and conforming with respective portions of said conical inside surface portion of said sleeve member and having two flanks extending from the outside of the jaw portion in planes which intersect each other in a line extending from and enclosing a substantially right angle with the longitudinal axis of the chuck, the width of the outside surface of said embossments being substantially greater than the radial protrusion of said embossments.

6. A chuck for drills and lathes comprising a closing sleeve member having a conical inside surface portion; a collet axially slidable in said sleeve member and having a portion with a conical outside surface facing said inside surface portion, substantially radial slots in said collet extending in axial direction from one end thereof through its portion with the conical outside surface and forming a plurality of radially resilient jaw portions on said collet, longitudinal embossments protruding from the outside of said jaw portions between said slots, each embossment having an outside surface engaging and conforming with respective portions of said conical inside surface portion of said sleeve member and having two flanks extending from the outside of the jaw portion in planes which intersect each other in a line extending at the apex of an imaginary cone, on whose surface the outside surfaces of said embossments are located, from and enclosing a substantially right angle with the longitudinal axis of the chuck, the width of the outside surface of said embossments being substantially greater than the radial protrusion of said embossments.

7. A chuck for drills and lathes comprising a closing sleeve member having a conical inside surface portion; a collet axially slidable in said sleeve member and having a portion with a conical outside surface facing said inside surface portion, substantially radial slots in said collet extending in axial direction from one end thereof through its portion with the conical outside surface and forming a plurality of radially resilient jaw portions on said collet, longitudinal embossments protruding from the outside of said jaw portions between said slots, each embossment having an outside surface engaging and conforming with respective portions of said conical inside surface portion of said sleeve member and having two flanks extending from the outside of the jaw portion in planes which are symmetric with respect to an imaginary diametrical median plane of the respective jaw portion, the width of the outside surface of said embossments being substantially greater than the radial protrusion of said embossments, the tangent plane to the outside surface of the embossment at the intersection of said surface with a flank enclosing with the plane of said flank an angle which is greater than the angle of friction of the materials of which the collet and the work are made.

ANDRÉ BECHLER.

REFERENCES CITED

The following references are of record in the file of this patent:

UNITED STATES PATENTS

| Number | Name | Date |
|---|---|---|
| 342,697 | Johnson | May 25, 1886 |
| 864,671 | Myers | Aug. 27, 1907 |

FOREIGN PATENTS

| Number | Country | Date |
|---|---|---|
| 224,006 | Switzerland | of 1943 |
| 435,743 | Great Britain | of 1935 |